Jan. 1, 1963 J. D. CORBIN 3,070,895
INCLINOMETER
Filed Oct. 13, 1960 2 Sheets-Sheet 1

INVENTOR.
JOSEPH D. CORBIN
BY
Moore, White & Burd
ATTORNEYS

Jan. 1, 1963
J. D. CORBIN
3,070,895
INCLINOMETER
Filed Oct. 13, 1960
2 Sheets-Sheet 2
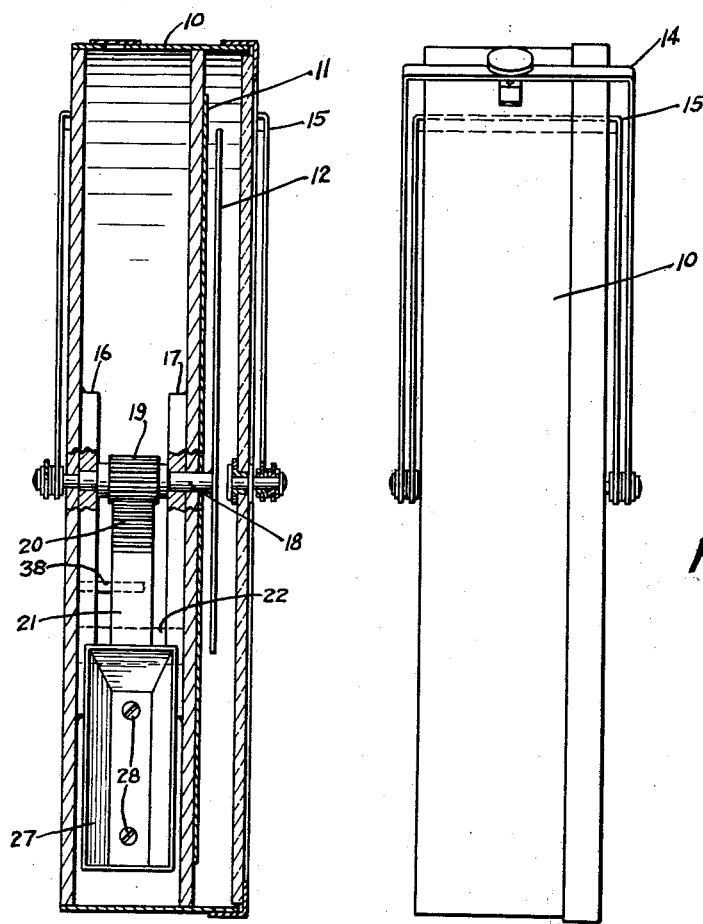
FIG. 3
FIG. 4
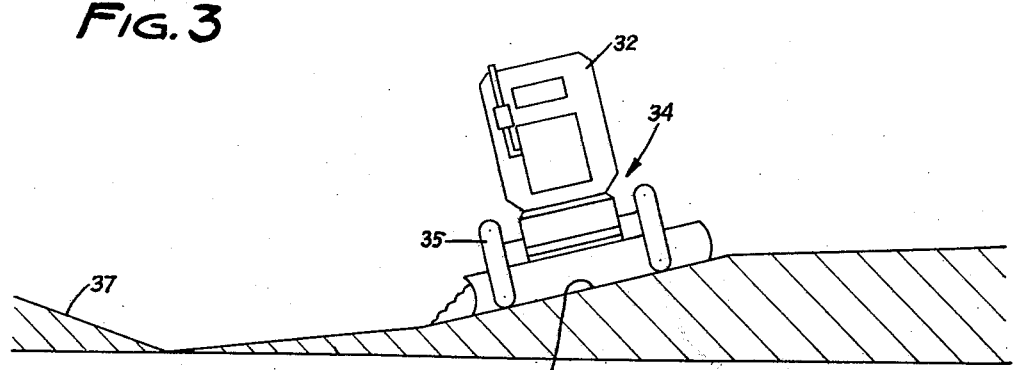
FIG. 5
INVENTOR.
JOSEPH D. CORBIN
BY
Moore, White & Burd
ATTORNEYS

United States Patent Office 3,070,895
Patented Jan. 1, 1963

3,070,895
INCLINOMETER
Joseph D. Corbin, Hot Springs County, S. Dak.
Filed Oct. 13, 1960, Ser. No. 62,391
7 Claims. (Cl. 33—215)

This invention is a special form of inclinometer for measuring the degree of angle to which grading machines have been tipped in the course of preparing ground for various uses. It is believed to be novel, among other reasons, in its use of scoops on its actuating weight. These scoops coact with a dampening liquid in the instrument to reduce the oscillation of the meter as the equipment for which it is used changes its angle of tip. The structure of this invention is further novel in combining the dampening oil engaging scoop with a weight operated needle indicator to show the angle at which the device on which the inclinometer is mounted tipped.

While inclinometers of various sorts are not new per se, until the present invention there appears to have been little use of these devices in preparing road beds and other earth surfaces to receive finish applications of various types. In the past it has been common for grading machine operators to perform similar work by using a practiced eye born of long experience to approximate the grade to be achieved. The grading was then checked with instruments by engineers in charge of the operation and any corrections performed again by judgment rather than any sort of indicating device.

Furthermore, the first application of inclinometers to road grading devices proved to be not too advantageous, since the needles thereof fluctuated so wildly when changes of grading angle occurred that the operator could only interpolate what the actual reading of the meter was by observing the needle for at least two fluctuations. However, the operator's attention was and is also required to operate his controls and to observe the other persons working in the area. This necessity to observe the meter for several fluctuations in order to arrive at the approximate angle reading minimized the advantages to be obtained for the use of such an instrument. The fluctuating angle indicators provided slightly better guesses than an experienced operator might be able to judge simply by observation of the grade being effected. They also provided the inexperienced with something to judge by. Nevertheless these inclinometers have remained something less than completely satisfactory.

Accordingly it is the principal object of this invention to provide a novel inclinometer.

It is a further object of this invention to provide an inclinometer the needle readings of which are relatively stable at any given moment.

It is a further object of this invention to provide an inclinometer that substantially avoids fluctuations by means of an oil engaging scoop securely attached to the weight mechanism that operates the instrument.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 3 is a vertical section taken on the line 3—3 of FIGURE 2 and drawn to the same scale as that figure;

FIGURE 4 is a side elevation of the device drawn to the same scale as FIGURE 2; and FIGURE 5 is a rear elevation, drawn to a much smaller scale than any of the preceding figures, of a grading machine making one of several cuts in forming a road bed.

Figure 1:
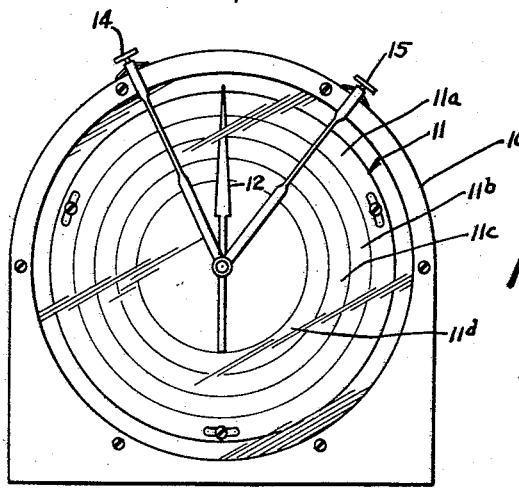
FIGURE 1 is a reduced front elevation of the invention.

Referring to the drawings and particularly to FIGURE 1 the invention can be seen to have a housing 10 having a dial 11 incorporating a series of scales thereon designated 11a, b, c, and d. A pivoting needle is secured to the center of dial 11. A pair of manually adjustable markers 14 and 15 may be set to indicate the desired grade to be achieved. When the pointer 12 aligns with a particular one of the markers 14 or 15, it will be known that the desired grade has been achieved. Pointer 12 is rotatably supported in suitable bearing blocks which is the one 16 and 17 in FIGURES 2 and 3. A shaft 18 which supports the pointer 12 also carries a pinion gear 19 which is engaged by the teeth of the sector 20. The sector carrying element 21 is also pivoted in suitable bearings in the bearing blocks 16—17 and on a shaft designated 22. The upper portion of the sector element is open as at 23 but is solid on its lower portions to form weight 24. Surrounding weight 24 is a damping liquid 25 which fills the lower portion of the case within which the sector member 21 turns. Secured to or formed integrally with (and here shown in the preferred form of being separate units attached to the rest of the structure) are the scoops 26 and 27. Any suitable means may be used to secure the scoops 26—27 to weight 24 such as screws 28 shown in scoop 26, FIGURE 2. Any effort of the weight to move through the liquid 25 in the case 10 is materially slowed down by the scoops 26 and 27 reacting with oil 25.

Figure 2:
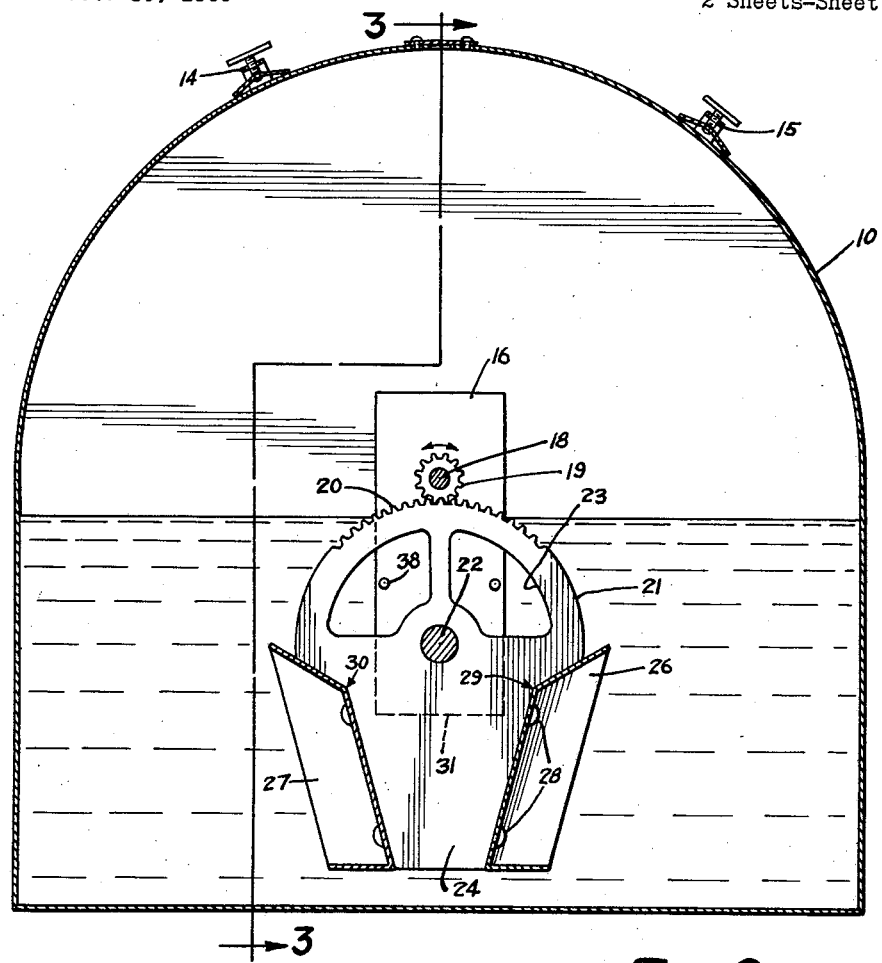
FIGURE 2 is a vertical section showing the operating mechanism and with portions broken away; hidden portions are shown in broken lines.

While it may not be obvious from an examination of FIGURE 2, the bearing block 16 is of such dimensions that the upper ends of scoops 26—27 will not engage it as weight 24 swings. That is to say the arc described by the upper end 29 for scoop 26, and 30 for scoop 27 will not touch the lower corners 31 of the bearing block 16 when the sector bearing element 21 pivots. As a result, the scoops 26—27 may be flared outwardly as to approach close to the case 10 as shown clearly in FIGURE 3. So flaring the scoops causes them to engage a greater amount of the damping fluid in their path.

While the scoops 26—27 may be made in any suitable manner as by casting integrally with the sector bearing element 21 and specifically with the weight portion 24 thereof, they may also be advantageously fabricated from sheet metal and secured to the segment bearing element separately. The separately fabricated scoops are generally considered preferable principally because they can be more readily manufactured in this manner than by forming them with the sector element.

The bearings of bearing block 16 are preferably of the plain sleeve type of bearing as distinguished from a type of bearing generally referred to as friction reducing and consisting of a pair of races separated by rollers, balls or needles. Such sleeve bearings, while perfectly adequate to provide necessary freedom of movement for the needle of the device, are preferable in that they aid in reducing the speed at which the needle moves. This resistance to turning by the bearings coupled with the damping action of the liquid 25 and scoops 26—27 minimize fluctuation of needle 12. Furthermore, plain bearings will stand considerably rougher usage without damage than will most friction reducing bearings. The former bearings have large load bearing surfaces and the latter have very small load bearing surfaces. As a result the former spreads any pressure applied over a broad surface thereby reducing the pounds per square inch loading of the bearing surface to minimum. Friction reducing bearings on the other hand have a contact only at small points which tends to emphasize the pound per square inch pressures applied to bearing surfaces. Friction reducing bearings require much tougher materials in order to sustain the same load. Hence, while instruments generally require low friction bearings, this one is more effective with sleeve bearings.

While a single dial face or scale could be used, the various scales designated 11a, b, c, and d are particularly satisfactory providing direct readings for various types of grade designation. Scales 11a and b are two different scales calibrated in terms of difference in altitude between the shoulder and crown of a roadway, one specifically the scale 11a being for a thirty-two foot roadway and scale 11b being for a twenty-four foot roadway. Scale 11c designates the number of feet of lineal measure required to produce one foot of drop at a particular angle of the grader blades. The final scale is calibrated in terms of percent of slope. The percentage slope is determined by dividing the amount of drop by the number of feet of lineal measure over which the drop is spread. For example, if a grade must be arranged so as to produce a three foot drop over a width of twelve feet the percentage of slope would be determined by dividing 3 by 12. Such a division provides a figure of 25% which is the percentage of slope. Another way of expressing this same grade is to say that there is a one foot drop for every four feet of lineal measure of the grade on a horizontal line. By providing all these different scales the operator of the grading machines may readily determine whether or not he is cutting the proper grade regardless of the langauge. By thus employing a plurality of scales on dial face 11, the operator of the grading machinery can directly determine whether he is properly grading a particular area regardless of the manner in which the engineer in charge of the project describes the grade. Whether he gives a figure of the difference in feet between the crown and the edge of the road, or a slope in terms of the number of feet a drop produced in a given number of lineal measure, or expresses it as a percent of slope, the road grader operator can read directly his instrument to determine whether or not he is cutting the slope as ordered.

Turning to FIGURE 5, the inclinometer would be mounted in the cab 32 of the road grader generally designated 34. The wheels 35 of the grader following the surface 36 being graded will tip the cab and show on the inclinometer whether the slope of surface 36 is as steep as desired or requires further cutting. As cab 32 of the grading machine tips as shown in FIGURE 5, weight 24 in seeking a vertical position from its pivot point 22 will turn the sector 20 in the direction of a full line arrow on it in that figure. In response thereto, pinion gear 19 will turn in the direction of the full line arrow above it which in turn will cause needle 12 to move with respect to dial 7 in the direction toward the indicator 14. When proper grade is finally achieved, indicator 14 and dial needle 12 will align with each other. When cutting the surface such as the back grade 37, the indicator 15 is used with needle 12 to give the correct slope for the back grade. On the opposite side of the roadway the exact reverse action will occur with respect to the indicators and needle 12. Whenever tipping the machine causes weight 24 to try to change its position with respect to bearing plate 16 as the result of the pull of gravity on the weight 24, the oil engaging the scoops 26, 27 will tend to retard the reaction so that the needle will log slightly the tip of the machine. The needle will not over indicate, therefore, and only a glance at it will instantly tell the operator whether he is achieving a proper slope, or if he has not yet achieved a proper slope. If he has not yet achieved a proper slope, it will indicate how much more change in slope is necessary to accomplish this end.

While the device in use will not normally be subjected to tilting that will carry the sector to a position so that a portion thereof other than the teeth on it engage gear 19, it could happen in shipment or handling prior to installation. Any movement of such nature that is violent could place considerable radial strain on gear 19 and shaft 13. To avoid any such possibility, stop pins 38 are provided which are secured to support 16. They extend into the openings 23 of sector 20 and limit the movement of sector 20 to an arc within which the toothed portion only of sector 20 engages gear 19. Stated another way, pins 38 limit the forces applied to gear 19 by sector 20 to rotational forces.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A liquid tight case, a pendulous weight pivoted within said liquid tight case, damping liquid within said liquid tight case, means in said liquid tight case associating said pendulous weight operatively with an indicating mechanism, said damping liquid surrounding said pendulous weight and retarding without preventing pivoting movement thereof, and flared scoops secured to said weight member for increasing the retarding action caused by said liquid.

2. The device of claim 1 in which there are means secured to said liquid tight case angularly and manually movable with respect to said dial to show visually the desired degree of deviation from the horizontal to be achieved.

3. A device for designating the extent of deviation from the horizontal, of a known surface comprising liquid tight case, a dial formed on the face of said liquid tight case, a needle pivotally supported in said liquid tight case adjacent said dial, a weight pivoted inside said liquid tight case, means interconnecting said needle and said weight to produce movement of the former as the result of movement of the latter, liquid in said liquid tight case surrounding said weight, and flared scoops secured to said weight for increasing the retarding action of said liquid.

4. The device of claim 3 in which said dial has a plurality of different scales giving the deviation from the horizontal by different terms of reference.

5. The device of claim 4 in which there are means secured to said liquid tight case angularly and manually movable with respect to said dial to show visually the desired degree of deviation from horizontal to be achieved.

6. The device of claim 5 in which there are means secured to said liquid tight case angularly and manually movable with respect to said dial to show visually the desired degree of deviation from the horizontal to be achieved.

7. The device of claim 3 in which there are means secured to said liquid tight case angularly and manually movable with respect to said dial to show visually the desired degree of deviation from the horizontal to be achieved.

References Cited in the file of this patent

UNITED STATES PATENTS

| | | |
|---|---|---|
| 667,836 | Wood | Feb. 12, 1901 |
| 1,232,394 | Potter | July 3, 1917 |
| 1,370,233 | Spier | Mar. 1, 1921 |
| 1,959,544 | Paulin | May 22, 1934 |

FOREIGN PATENTS

| | | |
|---|---|---|
| 214,324 | Australia | Mar. 10, 1958 |